(12) United States Patent
Bihler et al.

(10) Patent No.: US 7,149,653 B2
(45) Date of Patent: Dec. 12, 2006

(54) INFORMATION SYSTEM IN A MOTOR VEHICLE WITH DRIVING-STYLE-DEPENDENT PRODUCTION OF INFORMATION TO BE OUTPUTTED

(75) Inventors: Edgar Bihler, Böblingen (DE); Guenter Dobler, Altbach (DE); Florent Paviot, Tévoux (FR); Siegried Rothe, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 14 days.

(21) Appl. No.: 10/494,669

(22) PCT Filed: Oct. 31, 2002

(86) PCT No.: PCT/EP02/12144

§ 371 (c)(1),
(2), (4) Date: Feb. 11, 2005

(87) PCT Pub. No.: WO03/039914

PCT Pub. Date: May 15, 2003

(65) Prior Publication Data

US 2005/0143884 A1     Jun. 30, 2005

(30) Foreign Application Priority Data

Nov. 6, 2001 (DE) ................................. 101 53 987

(51) Int. Cl.
G08B 21/00 (2006.01)
(52) U.S. Cl. ...................... 702/182; 702/183; 702/188; 340/540

(58) Field of Classification Search ................ 702/182, 702/183, 188, FOR. 163, FOR. 170, FOR. 171, 702/FOR. 155; 340/903, 431, 439, 436, 340/540; 701/1, 29, 33, 34; 180/168, 271, 180/272
See application file for complete search history.

(56) References Cited

U.S. PATENT DOCUMENTS

| 4,240,071 | A | * | 12/1980 | Ochiai ........................ 340/576 |
| 5,074,144 | A | * | 12/1991 | Krofchalk et al. ......... 73/117.3 |
| 5,150,609 | A | * | 9/1992 | Ebner et al. ............... 73/117.3 |
| 5,390,117 | A | * | 2/1995 | Graf et al. .................... 701/57 |
| 5,465,079 | A | * | 11/1995 | Bouchard et al. ........... 340/576 |
| 5,467,277 | A |   | 11/1995 | Fujisawa et al. |
| 5,499,182 | A | * | 3/1996 | Ousborne .................... 701/35 |
| 5,769,085 | A | * | 6/1998 | Kawakami et al. ......... 600/519 |

(Continued)

FOREIGN PATENT DOCUMENTS

DE          3817495 A1    11/1989

(Continued)

Primary Examiner—Carol S.W. Tsai
(74) Attorney, Agent, or Firm—Crowell & Moring LLP

(57) ABSTRACT

Information system in a vehicle, having a plurality of information sources for outputting respectively associated information. The information which is to be output is generated and/or filtered as a function of the state of the driver and/or of the behavior of the driver. The state of the driver and/or of the behavior of the driver is determined by of data from one or more driving systems of the vehicle and/or one or more comfort systems of the vehicle. At least one of the information sources generates the information which is to be output with a frequency which depends on the state of the driver and/or the behavior of the driver.

13 Claims, 2 Drawing Sheets

U.S. PATENT DOCUMENTS

| | | |
|---|---|---|
| 6,249,720 B1 * | 6/2001 | Kubota et al. .................. 701/1 |
| 6,268,803 B1 * | 7/2001 | Gunderson et al. .......... 340/903 |
| 6,272,411 B1 * | 8/2001 | Corrado et al. ................ 701/45 |
| 6,285,930 B1 * | 9/2001 | Dickson et al. ................ 701/28 |
| 6,356,812 B1 * | 3/2002 | Cragun ........................... 701/1 |
| 6,370,454 B1 * | 4/2002 | Moore ........................... 701/29 |
| 6,564,127 B1 * | 5/2003 | Bauerle et al. ................ 701/33 |
| 6,925,425 B1 * | 8/2005 | Remboski et al. ........... 702/188 |
| 2002/0032510 A1 * | 3/2002 | Turnbull et al. ............... 701/49 |
| 2002/0103622 A1 * | 8/2002 | Burge .......................... 702/183 |
| 2003/0014176 A1 * | 1/2003 | Levine ......................... 701/70 |

FOREIGN PATENT DOCUMENTS

| | | |
|---|---|---|
| DE | 4120069 A1 | 1/1992 |
| DE | 4433953 A1 | 3/1996 |
| DE | 3628333 C2 | 4/1996 |
| DE | 4338244 C2 | 5/1996 |
| DE | 19507997 A1 | 9/1996 |
| DE | 19734307 C2 | 6/1999 |
| DE | 19961871 A1 | 7/2001 |
| DE | 19952857 C1 | 8/2001 |
| EP | 1013509 A2 | 6/2000 |
| WO | WO 92/03803 * | 3/1992 |
| WO | WO 00/07150 * | 2/2000 |
| WO | WO 00/31712 * | 6/2000 |
| WO | WO 00/34742 * | 6/2000 |
| WO | WO 01/32482 * | 5/2001 |
| WO | WO-0158724 A1 | 8/2001 |
| WO | WO-02058962 A1 | 8/2002 |

* cited by examiner

INFORMATION SYSTEM IN A MOTOR VEHICLE WITH DRIVING-STYLE-DEPENDENT PRODUCTION OF INFORMATION TO BE OUTPUTTED

This application claims the priority of German Patent Document No. 101 53 987.8, filed 6 Nov. 2001 and PCT/EP02/12144, filed 31 Oct. 2002 the disclosure of which is expressly incorporated by reference herein, respectively.

BACKGROUND AND SUMMARY OF THE INVENTION

The invention relates to an information system in a vehicle having a plurality of information sources.

Such an information system is known from German Application DE 199 52 857 C1. The information system filters information which is to be displayed from various information sources as a function of the state of mind of the driver. The state of mind of the driver is determined by means of a camera and/or a microphone in that image patterns and/or sound patterns of the driver which are recorded are compared with stored patterns and it is thus determined whether the driver is annoyed, ill or disturbed in some other way.

German Application DE 197 34 307 C2 discloses a device for monitoring and/or influencing the vehicle behavior, which device generates a warning signal or acts on the steering system as a function of whether the viewing direction of the driver deviates from the direction of travel. The viewing direction of the driver is determined by means of a camera.

The object of the invention is to permit improved outputting of information for the driver.

The information system outputs information from a plurality of information sources. Information which is to be output is understood to be information which is made available to the occupants of the vehicle, in particular to the driver, to be perceived. Information includes for example, warnings and instructions. In order to match the frequency of outputting the information to the state and/or the behavior of the driver, the generation of the information of the information sources is influenced by the state of the driver and/or the behavior of the driver. Of course, it is also possible for the information system to determine other vehicle occupants and their state and/or their behavior, and to react thereto in analogous fashion to the state of the driver and/or the behavior of the driver. A type of feedback of the state of the driver and/or of the behavior of the driver to the information sources therefore takes place in order to change the sensitivity of the sources.

In one advantageous development of the invention, the information system determines the state of the driver and/or the behavior of the driver. In the information source, the frequency with which information is generated is changed as a function of the state of the driver and/or of the behavior of the driver. This can take place, for example, by an intermediate step which determines the information requirement of the driver from the state of the driver and/or the behavior of the driver, and varying the frequency of the generation of information as a function of the information requirement of the driver. Influencing the generation of the information has the advantage that there is a direct effect on the information source, and the increased or lower information requirement of the driver is already taken into account in the generation of the information. In this way, the information source can already take into account during the generation of the information, for examples how close the information items follow one another and how attentive the driver is and/or with what he is occupied, and correspondingly adapt the content of the information. In this way, the frequency with which information sources make available information for outputting is adapted to the state of the driver and/or to the behavior of the driver. The frequency can, in particular, also include zero frequency zero, i.e. the switching off of the outputting process.

In one advantageous development of the invention, the information which has already been generated, that is, the information which is to be output, is filtered by the information system as a function of the state of the driver and/or of the behavior of the driver. This makes it possible for the information system not only to generate the information but also to match the filtering of the information precisely to the requirements of the driver.

The information system outputs information from a plurality of information sources and filters it as a function of the behavior of the driver. This has the advantage that the filtering of the information from a plurality of information sources takes into account what the driver is doing at that particular time. For this purpose, the information system determines the behavior of the driver. In an optional intermediate step, the information system can determine the information requirement of the driver from the behavior of the driver, and vary the filtering of the information which is to be output, as a function of the information requirement of the driver. This relieves the driver and/or attracts his attention in critical situations. For example, if he is doing something of secondary importance at that time, the safety of operation is improved.

In one advantageous embodiment of the invention, the filtering of the information is influenced not only by the behavior of the driver, that is to say what he is doing, but also by his state, i.e. for example whether he is attentive, distracted etc. For this purpose, the information system determines the state of the driver. In an optional intermediate step, the information system can determine the information requirement of the driver from the state of the driver, and vary the filtering of the information which is to be output, as a function of the information requirement of the driver. This relieves the driver and/or attracts his attention in critical situations. For example, if he is annoyed or distracted at that particular time, the operating safety can be improved.

The information system determines, by using of data from driving systems in the vehicle and/or comfort systems in the vehicle, the behavior of the driver, and/or the state of the driver. This data is already available in the vehicle for the purpose of coping with the driving function and/or for the purpose of increasing the comfort for the driver. This data is relevant to the behavior and/or the state of the driver and is evaluated by the information system in a suitable way. The information which is to be output from various information sources is then filtered as a function of the state of the driver, and/or generated by the information sources as a function of the state of the driver. Data which can characterize the behavior of the driver, for example, data relating to the control of the comfort systems of the vehicle and/or steering, accelerating, declutching, braking etc. If data occurs which indicates that the driver is steering, accelerating, declutching and/or braking etc., in a specific way, the inevitable conclusion is that he is in a state in which he is concentrating on the driving function. If data is present from which a behavior can be inferred which involves the driver controlling comfort systems, the inevitable conclusion is that the driver is in a state in which he is distracted. In contrast, if data from which active occupation with the driving function can be inferred is not present, this could indicate that the driver is tired and/or his condition is deteriorating. However, this conclusion is not inevitable since it may also simply be the case that the part of the route does not require any activity from the driver. Therefore, the state of the driver and/or the behavior of the driver can be inferred from the same data, it being possible for the conclusions to be inevitable or else also simply to indicate a state or a behavior.

The advantage of the invention is that the information system performs the evaluation of data which relates to the state of the driver or data which relates to the behavior of the driver which is already present in the vehicle. Additional devices for recording data which relates to the state of the driver or data which relates to the behavior of the driver, for example a microphone or camera, are not absolutely necessary.

The driving systems of the vehicle advantageously include at least one brake system, at least one clutch system, at least one steering system and/or at least one acceleration system. The driving systems can also include, for example, what are referred to as X-by-wire systems, for example drive-by-wire, steer-by-wire or brake-by-wire systems. In the case of a steer-by-wire system, the steering wheel can then be replaced, for example, by a joystick or a double joystick. In modern vehicles, these driving systems are connected to one another in order to exchange data. This data which is exchanged between the driving systems can then easily be used by the information system as data which relates to the state of the driver and/or as data which relates to the behavior of the driver. This data is, for example, data which is generated by the operation of the brake pedal, clutch pedal and/or accelerator pedal and/or the operation of the steering wheel.

The comfort systems of the vehicle advantageously include at least one of the systems such as, for example, air-conditioning system, navigation system, audio system and/or setting system for seat adjustment, steering wheel adjustment, mirror adjustment and/or for the activation of the window lifter, the steering wheel pushbutton keys and/or the seat memory pushbutton keys. In modern vehicles, these comfort systems are connected to one another in order to exchange data. This data which is exchanged between the comfort systems, can then easily be used by the navigation system as data which relates to the state of the driver and/or data which relates to the behavior of the driver. This data includes, for example, the control of comfort devices such as air-conditioning system, navigation device, radio and/or the setting of devices inside the vehicle such as seat, steering wheel, mirror etc. Also included as any activation operations on operator controlled elements such as, for example, switching on or off a driver assistance system, for example a system for controlling the distance between vehicles or a parking aid system.

Evaluating the information, which is to be output, before it is output has the advantage that only information which is matched to the state and/or the behavior of the driver is output. The information which is to be output can be evaluated, for example, by means of a prioritization of information. The information can be information which requests the vehicle occupants or the driver to undertake a specific action in the short term, medium term or long term, or which merely needs to be noted. As a function of the evaluation of the information, for example its priority and the state of the driver and/or the behavior of the driver, it is then possible to determine precisely which information is output in this situation, without providing the driver with too much information, which is unnecessary from his point of view.

The information sources advantageously include what are referred to as driver assistance systems which support the driver in his instantaneous vehicle driving function. These sources are, for example, a device for controlling the distance between vehicles, a dead angle monitoring unit or generally a lane-changing assistance device, a device for warning of bends and/or a device for automatic lane detection or for automatic guidance of the course of the vehicle. Of course, further future driver assistance systems may also be included such as a stop-and-go control device, a pedestrian detection system and/or a collision avoidance system. In driver assistance systems it is particularly important for the driver to feel that the information which is output is helpful and not superfluous. As a result, the driver accepts the system and follows its instructions, which contributes to greater traffic safety.

Information from the driver assistance systems typically request the driver to undertake an action in the short term. Typical information which the driver must react to only in the medium term or long term, i.e. not before, for example, several seconds have passed. These include typical operational fault messages such as excessively low engine oil, defective lamp, etc., but also for example a telephone call signal. Typical information which does not request the driver to undertake any particular vehicle-related action include for example, numerous operational state information items about whether specific vehicle components are activated or deactivated at a particular time, but also the music information and speech information which is provided by an electronic entertainment component. Prioritization according to the time in which it is necessary to react to information is advantageous in the evaluation of the information which is to be output.

In one advantageous development of the invention, the detection of the state of the driver and/or the detection of the behavior of the driver by use of data from driving systems and/or comfort systems in the vehicle by use of a device for detecting the state of the driver and/or a device for detecting the behavior of the driver is supplemented with data from driver observation systems. A driver observation system is based in particular on recordings of the driver, for example with a camera and/or on recording the utterances made by the driver, for example with a microphone. The image patterns and/or sound patterns which are recorded are then compared with stored patterns, and the state and/or the behavior of the driver is thus determined. A higher degree of reliability of the detection of the state of the driver and/or the of detection of the behavior of the driver is achieved by virtue of the data of the driver observation system, in addition to the data of the driving systems and/or comfort systems. This is particularly advantageous if a microphone and/or a camera is installed, for example, for voice-activated control for comfort functions and/or for the telephone hands-free device and/or for detecting persons for a driving authorization system. Although additional expenditure in comparison with the information system which uses exclusively the data from the driving systems and comfort systems which is present in any case then occurs as a result of the storage and evaluation of the sound patterns and/or image patterns which are necessary to detect the state of the driver and/or to detect the behavior of the driver, this additional expenditure provides even better reliability for detection of the state of the driver and/or for detection of the behavior of the driver.

In one advantageous development of the invention, two categories of data which relates to the state of the driver or data which relates to the behavior of the driver are detected. When data from the first category which relates to the state of the driver or the behavior of the driver occurs, the driver is in a state in which he is concentrating on his driving function, or he is behaving in such a way that he is actively driving. When data of the first category which relates to the state of the driver or to the behavior of the driver is present, the system detects that the driver is concentrating on the driver function, or is actively declutching, steering, accelerating etc. When data of the first category is not present, the system determines a behavior of the driver in which the driver is not driving actively and/or a state of the driver in which the condition of the driver is deteriorating, i.e. the driver is becoming tired. When data from the second category which relates to the state of the driver or to the behavior of the driver occurs, the driver is occupied with things other than the driving function, for example with controlling comfort systems, and his state is that the driver is distracted and/or not concentrating, that is to say not actually concentrating on the driving function. This embodiment of the invention has the advantage that the information system determines whether the outputting of information, in particular from a driver assistance system, is really necessary at this time, or whether at this moment the driver is attentively observing the traffic situation, or even intentionally bringing about the traffic situation.

One example of an advantageous embodiment of the invention is that in a driving situation which is intentionally brought about by the driver, i.e. when data of the first category which relates to the state of the driver or which relates to the behavior of the driver occurs, the information system filters out the information, and/or the information source restricts the generation of information. This means that the information system delays or suppresses the outputting of such information which would be disruptive, or even constitute additional stress for the driver, in this situation. Alternatively and/or additionally, the sensitivity of information sources, in particular of a driver assistance system, is reduced so that less information to be output is already generated by the information source. If data of the second category which relates to the state of the driver or to the behavior of the driver is detected, the outputting of information is instead promoted and/or the sensitivity of the information source, for example of the driver assistance system, is increased, since, for example, information of a driver assistance system can warn the inattentive driver about an accident. In particular, after a state in which the information system is less sensitive, or has filtered out more information, it returns to a state of higher sensitivity if data of the second category is detected. This more sensitive state is maintained during a time period $T2_0$. $T2_0$ can be selected as desired and under certain circumstances can also be set by the driver himself or adapted to the driver in a learning system.

The information system according to the invention therefore makes it possible for the driver, for example, to be able to intentionally perform a lane change without the driver assistance system unnecessarily warning him when he passes over a mark since the information system perceives the steering movement as data of the first category, and is subsequently less sensitive, or filters out more information. If the driver operates, for example, his radio after the lane change, this is detected as data of the second category and more information is output or generated. When the radio is operated, the driver is therefore made aware, by means of warning information, that he is leaving the lane. This outputting and/or generation of information from the driver assistance system which is adapted to the state of the driver and/or the behavior of the driver increases the acceptance of the driver assistance system by the driver. The higher acceptance of the driver assistance system by the driver in turns leads to an improved driving safety.

In one advantageous development of the invention, it is determined when no data of the first category is present for a period $T1_0$. In this case, the information system goes into a state in which it instead promotes the outputting of information and/or the sensitivity of the information sources, for example of the driver assistance system, is increased.

The access of the information system to the data of the driving systems, to the data of the comfort systems, to the data of the driver observance systems and/or to the information sources is configured in a particularly simple way if the information system is connected to the driving systems, the comfort systems and/or the driver observation systems via a data bus. In this case, the driving systems, the comfort systems, the driver observation systems and/or the information sources on the bus exchange the data with one another. The information system is a further bus user which participates in the communication and receives via the bus the data which relates to the state of the driver or to the behavior of the driver. In one development of the invention, the information system can also selectively request data via the data bus. Various bus architectures are also conceivable. For example, the driving systems can thus be connected via one or more buses, for example CAN (Controller Area Network) with a high transmission speed and/or LIN (Local Interconnect Network), and the comfort systems can be connected via one or more buses, for example CAN with a relatively low and/or high transmission speed D2B (Domestic Digital Bus), MOST (Media Oriented System Transport) and/or a wire-free radio interface such as Bluetooth. The connection of the buses to one another is then carried out for example by means of a router, a bridge or a gateway depending on the degree of protocol conversion. It is also conceivable that the networking is not carried out separately according to driving systems and comfort systems but rather that the information system is connected to the driving systems, the comfort systems, the information sources and/or to the driver observation systems via one or more buses according to any desired architectures. Buses for transmitting data are then, for example, CAN with a high and/or low transmission speed and/or LIN and/or D2B and/or MOST and/or Bluetooth.

Preferred exemplary embodiments of the invention are described below with reference to the associated drawings, in which, in each case in a schematic view,

DETAILED DESCRIPTION OF THE PREFERRED EMBODIMENT

Figure 1:
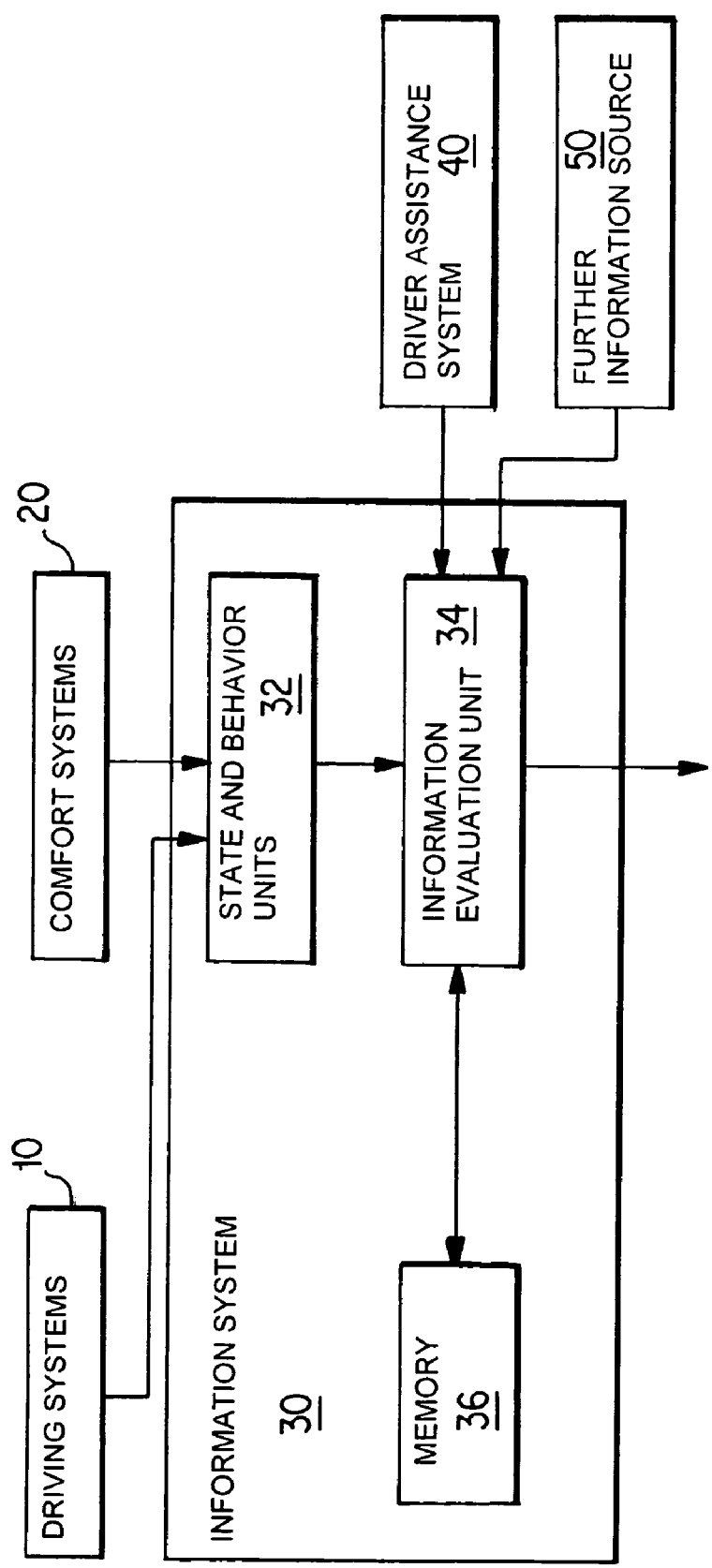
FIG. 1 shows an information system.

In FIG. 1, an information system is illustrated in a schematic form. Data from driving systems 10 and/or comfort systems 20 is fed to the information system 30. The information system 30 is composed of a unit for determining the state of the driver or the behavior 32 of the driver, a unit for evaluating information 34 which is to be output, and a memory 36 for buffering information which is to be output and whose outputting has been postponed. Information which is to be output is fed to the information system 30 from the information sources 40, 50. In modern vehicles, a large amount of data relating to the status of the vehicle, the operator control behavior of the driver and further driver parameters or vehicle parameters is available. When components 10, 20, 30, 40 and 50 are networked, a large part of this information is available in a bus network, for example CAN, LIN, MOST, Bluetooth, and are thus easily accessible.

The information system 30 determines the state of the driver or the behavior of the driver in the unit 32 from data from the systems 10 and 20 which relates to the state of the driver or to the behavior of the driver, and in the unit 34 the information system 30 links the state or the behavior of the driver to information which is to be output by driver assistance systems 40 and/or further information sources 50, for example a navigation system, a telephone, an audio system, vehicle sensors for cooling water temperature, level of fuel in the fuel tank, or state of the lights. In this context, the information which is to be output is evaluated in the unit 34. The evaluation is advantageously carried out as a function of the state of the driver which is determined or the determined behavior of the driver. In this context, by means of a sequence which is illustrated schematically in FIG. 2, it is determined, in the unit 34, whether information is to be output.

Figure 2:
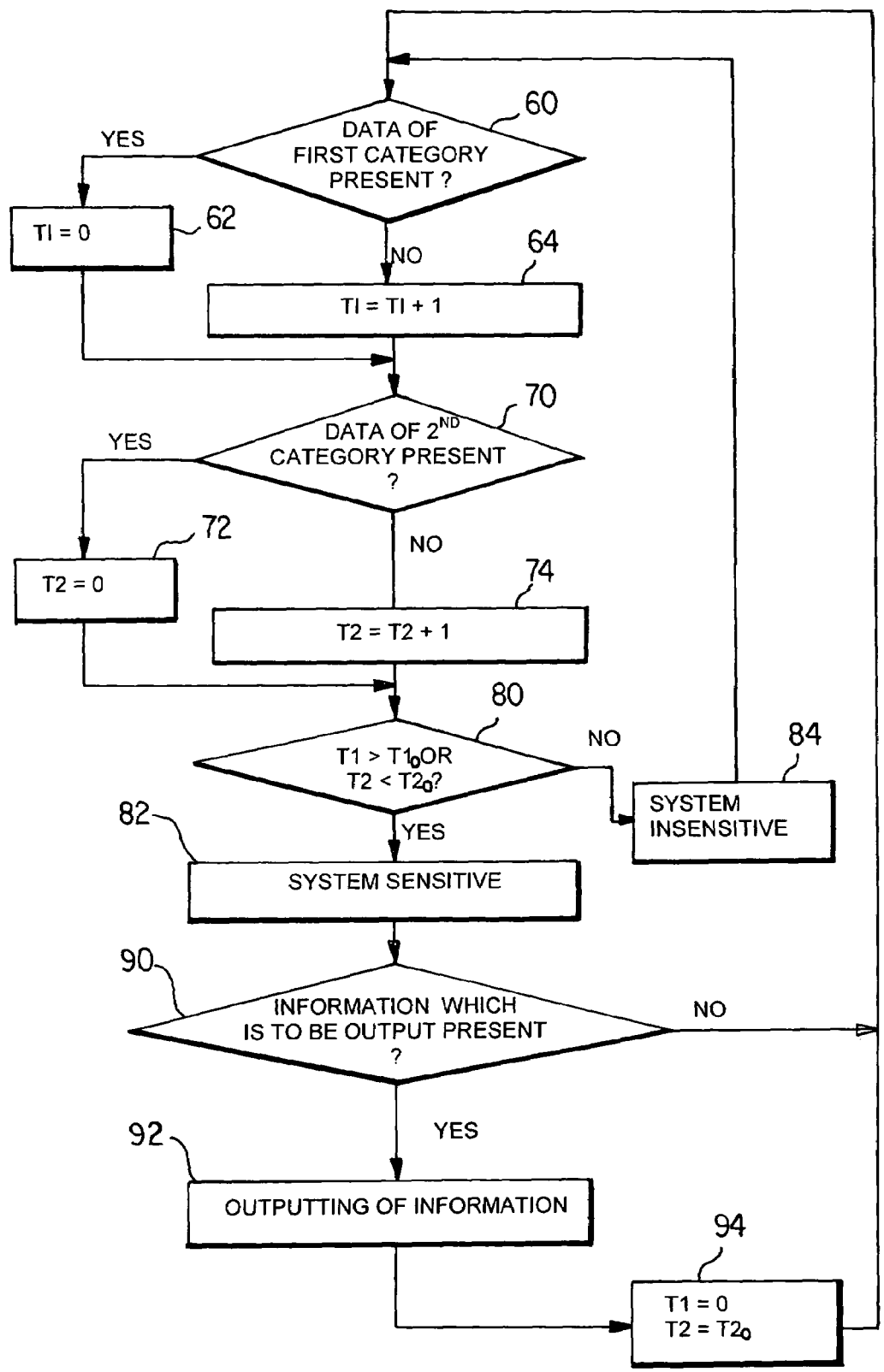
FIG. 2 is a flowchart relating to the filtering of information to be output.

The sequence which is illustrated schematically in FIG. 2 relates to an information source and to information of a specific priority.

In step 60 it is tested whether data of the first category which relates to the state of the driver or to the behavior of the driver is present. This data indicates that the driver is actively occupied with the driving function and/or has perceived a traffic situation and/or is intentionally bringing a traffic situation about. This data may comprise all the data from driving systems which are directly involved with the driving function, for example the operation of the brake pedal, clutch pedal or accelerator pedal and/or of the steering wheel, for example with a steering movement $\geqq 2°$. This data has an output-inhibiting effect—branch "yes", step 62. The counter variable for the time T1 is reset to 0 in step 62.

If data of the first category is not present, the information system detects the state of the driver in which the condition of the driver is deteriorating, i.e. increasing tiredness—branch "no". The counter variable for the time T1 is therefore incremented by one time unit in step 64.

In step 70, it is checked whether data of the second category which relates to the state of the driver or to the behavior of the driver is present. This data indicates that the driver is distracted and/or is not concentrating so that he cannot perceive specific traffic situations, or can only perceive them to a restricted degree. These may be all the actions in the vehicle which are not directly involved with the driving function, which therefore relate to comfort systems in the vehicle. Examples include operation of comfort devices such as air-conditioning system, navigation device, radio, seat adjustment, steering wheel adjustment and/or mirror adjustment. Data from driver observation systems can also give indications about the distraction of the driver, and is also included in the second category if the driver is distracted.

If data of the second category is determined in step 70, branch "yes", the driver is clearly distracted and/or not concentrating. The corresponding counter variable T2 is set to 0 in step 72.

If no data of the second category is determined in step 70, branch "no", the counter variable T2 is incremented by one time unit in step 74.

In step 80, the system determines whether the time T1 which has passed since the last data of the first category occurred is longer than the threshold value $T1_0$, or whether the time T2 which has occurred since the last data of the second category occurred is still below the threshold value $T2_0$. It is therefore tested whether the driver has actively driven during the previous time $T1_0$ or whether he has operated comfort systems during the previous time $T2_0$.

If at least one of the conditions is fulfilled, branch "yes", the system becomes "sensitive" in step 82, i.e. more information is generated or output.

If it is determined in step 80 that the time value has not exceeded the time threshold $T1_0$ and at the same time not dropped below the time threshold $T2_0$, the system becomes "insensitive" in step 84, i.e. less information is generated or output, and the sequence returns to step 60.

After step 82, it is tested in step 90 whether information which is to be output is at all present. If information is present, branch "yes", the information which is to be output is output in step 92. Then, in step 94, the counter T1 is reset to 0, and the counter T2 is incremented to the threshold $T2_0$. The sequence returns to step 60.

If no information for outputting is present in step 90, branch "no", the sequence returns directly to step 60.

In particular steering movements are suitable as data of the first category which relates to the state of the driver or to the behavior of the driver. Steering movements can be sensed, for example, by means of the steering wheel angle, the yaw rate, the cornering speed and/or the transverse acceleration of the vehicle. An awake driver continuously carries out steering corrections while driving. This is caused by the geometry of the road such as its convex nature or by irregularities, but also by random continuous microcorrections. As tiredness increases, the steering behavior changes, and the frequency of the steering corrections decreases.

The sensitivity of a driver assistance system, in particular of a lane detection system, can be varied as follows. The times between steering maneuvers of the driver are sensed. If this time is above a certain threshold value $T1_0$, the driver assistance system is switched into a state in which it is ready to output a warning. This readiness of the driver assistance system is terminated by the occurrence of the event at which a warning is then issued, or by a relatively large steering maneuver. The relatively large steering maneuver corresponds here to a data item of the first category. By selecting the time threshold value $T1_0$ as a relatively large or relatively small value, the sensitivity of the lane detection system can then be changed as a function of the state of the driver. If frequent activation of the driver assistance system indicates increasing tiredness of the driver, the time threshold value $T1_0$ can typically be reduced in order to increase the sensitivity of the driver assistance system.

The data of the second category which relates to the state of the driver or to the behavior of the driver is also included, so that, when such a data item occurs, the readiness of the driver assistance system is activated for a specific time period. Typical values for the duration of the activation are approximately values $T2_0 \leqq 10$ s.

If data of the first category which relates to the state of the driver or to the behavior of the driver occurs, the driver assistance system remains insensitive. If data of the first category does not occur during the time period up to the expiry of the time threshold value $T1_0$, the system is switched to the sensitive state again. If data of the first category and of the second category occur simultaneously, the system is also switched to the sensitive state.

The time threshold value $T1_0$ and/or $T2_0$ can also be adapted as a function of the type of road, for example motorway, trunk road, trunk road with a large number of bends, country road, twisting road, country road which passes through localities. The type of road can be determined, for example by means of a locating system, for example GPS, and a digital map.

The information system can optionally be supplemented by also providing the possibility of entirely rejecting information in order to supply the driver only with information which is most necessary. The rejection of information can be carried out, for example, in such a way that only the information which is categorized as very critical is still output, while the information which is more of an informative character is rejected.

The invention claimed is:

1. An information system for a vehicle, comprising:
 a plurality of information sources for outputting respectively associated information generated as a function of at least one of a behavior of the driver and a state of the driver;
 at least one driving system of the vehicle and at least one comfort system of the vehicle wherein said at least one of the behavior of the driver and the state of the driver is determined by data from said at least one driving system and said at least one comfort system wherein the data comprises two categories of data, with data of a first category at least one of characterizing a behavior of the driver in which the driver is actively occupied with the driving function, and characterizing a state of the driver in which the driver is concentrating on the driving function, and data of a second category characterizing at least one of behavior of the driver in which the driver is occupied with controlling the comfort systems, and characterizing a state of the driver in which the driver is at least one of distracted and not concentrating.

2. The information system as claimed in claim 1, wherein at least one of the information sources generates the information which is to be output, with a frequency which depends on and least one of the state of the driver and the behavior of the driver.

3. The information system as claimed in claim 1, wherein the information which is to be output is filtered as a function of said at least one of the state and the behavior of the driver.

4. The information system as claimed in claim 1, wherein said at least one driving system comprises at least one of a brake system, a clutch system, a steering system and a acceleration system.

5. The information system as claimed in claim 1, wherein said at least one comfort systems comprises at least one of an air-conditioning system, a navigation system, an audio system and a setting system for seat adjustment, a steering wheel adjustment and a mirror adjustment.

6. The information system as claimed claim 1, wherein the information which is to be output is evaluated and subsequently filtered as a function of the evaluation.

7. The information system as claimed in claim 1, wherein the plurality of information sources comprise at least one driver assistance system.

8. The information system as claimed in claim 1, wherein at least one of the state of the driver and the behavior of the driver is determined by means of data of at least one driver observation system of the vehicle.

9. The information system as claimed in claim 1, wherein at least one of outputting of the information is impeded and less information to be output is generated by the information source if data of the first category is detected.

10. The information system as claimed in claim 1, wherein at least one of the outputting of the information is promoted and more information to be output is generated by said plurality of information sources if data of the first category remains for longer than a first time period ($T1_0$).

11. The information system as claimed in claim 1, wherein at least one of the outputting of the information is promoted for the duration of a second time period ($T2_0$) and more information to be output is generated by said plurality of information sources if data of the second category is detected.

12. The information system as claimed in claim 1, wherein the information system is connected to at least one of the at least one driving system, to the at least one comfort system, to at least one driver observation system and to the plurality information sources via a bus.

13. The information system as claimed in claim 1, wherein the plurality of information sources comprise at least one of the one or more driving systems and said at least one comfort system.

* * * * *